Figure 1:
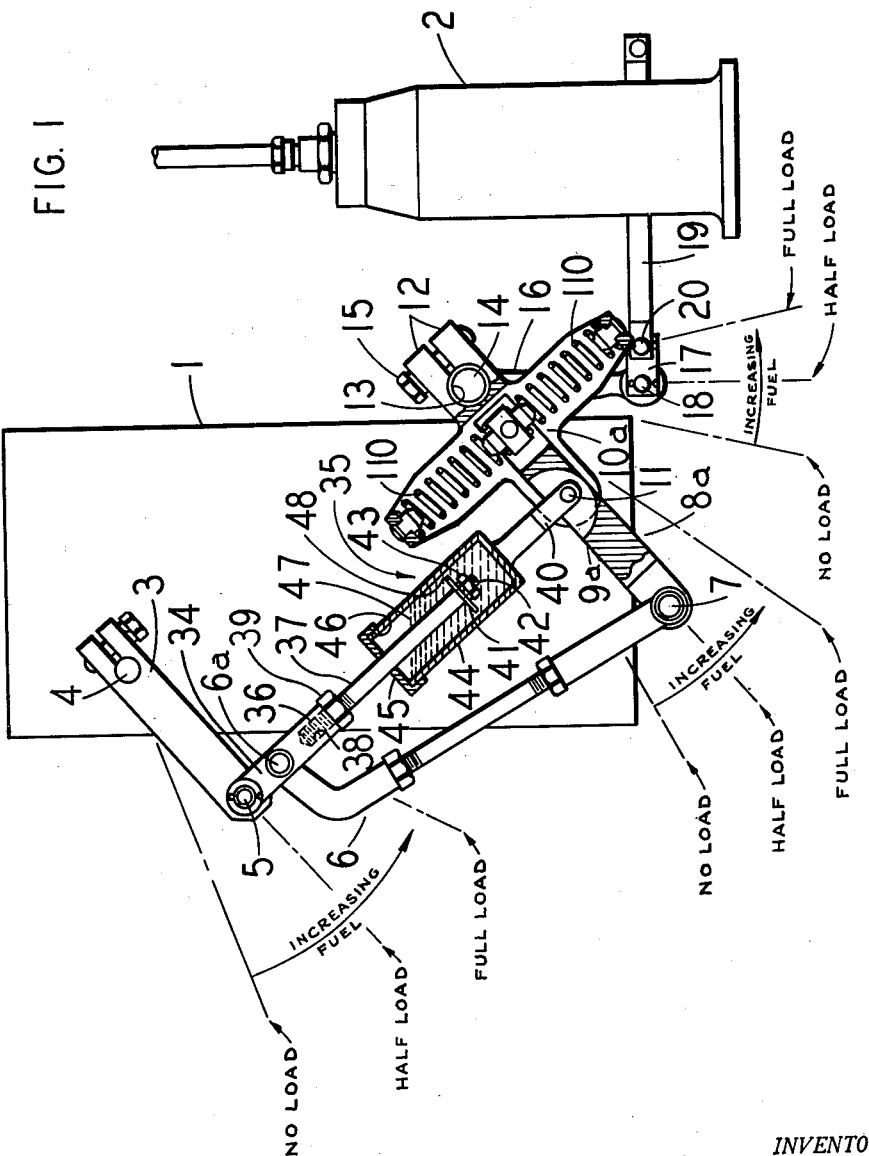

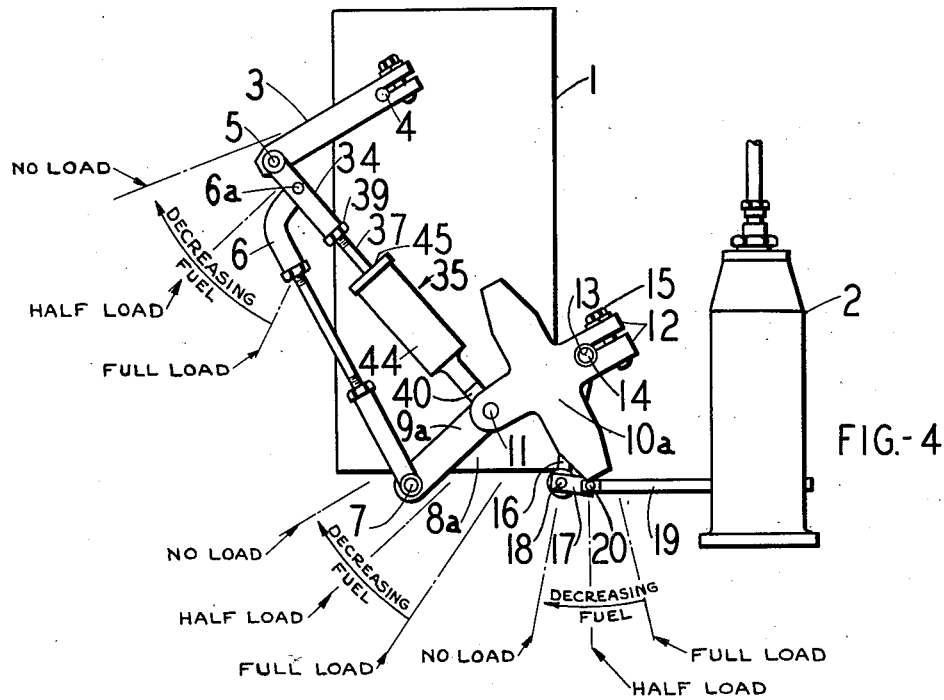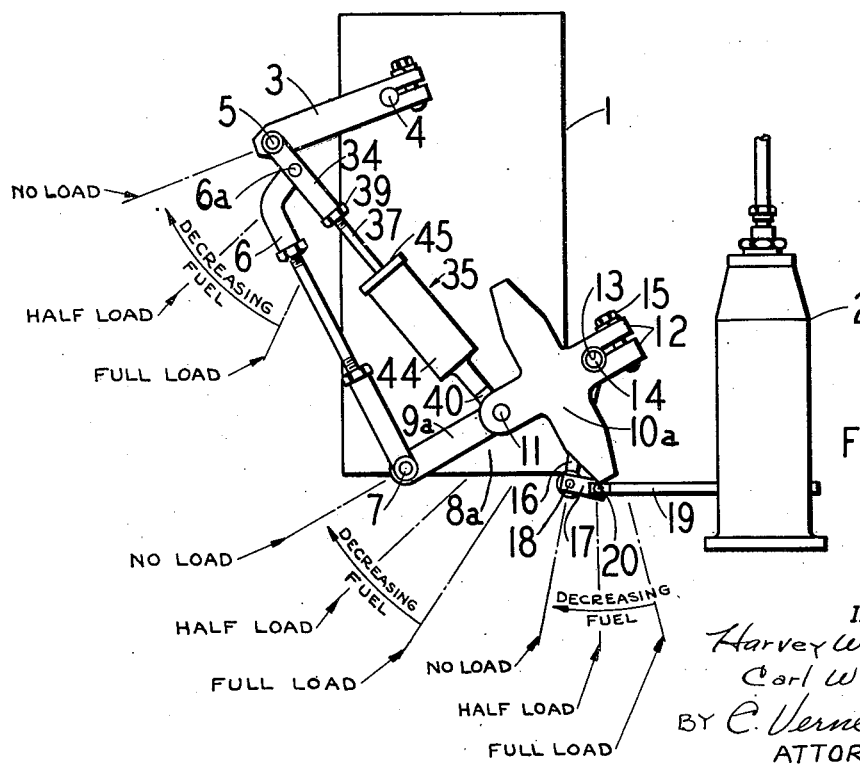

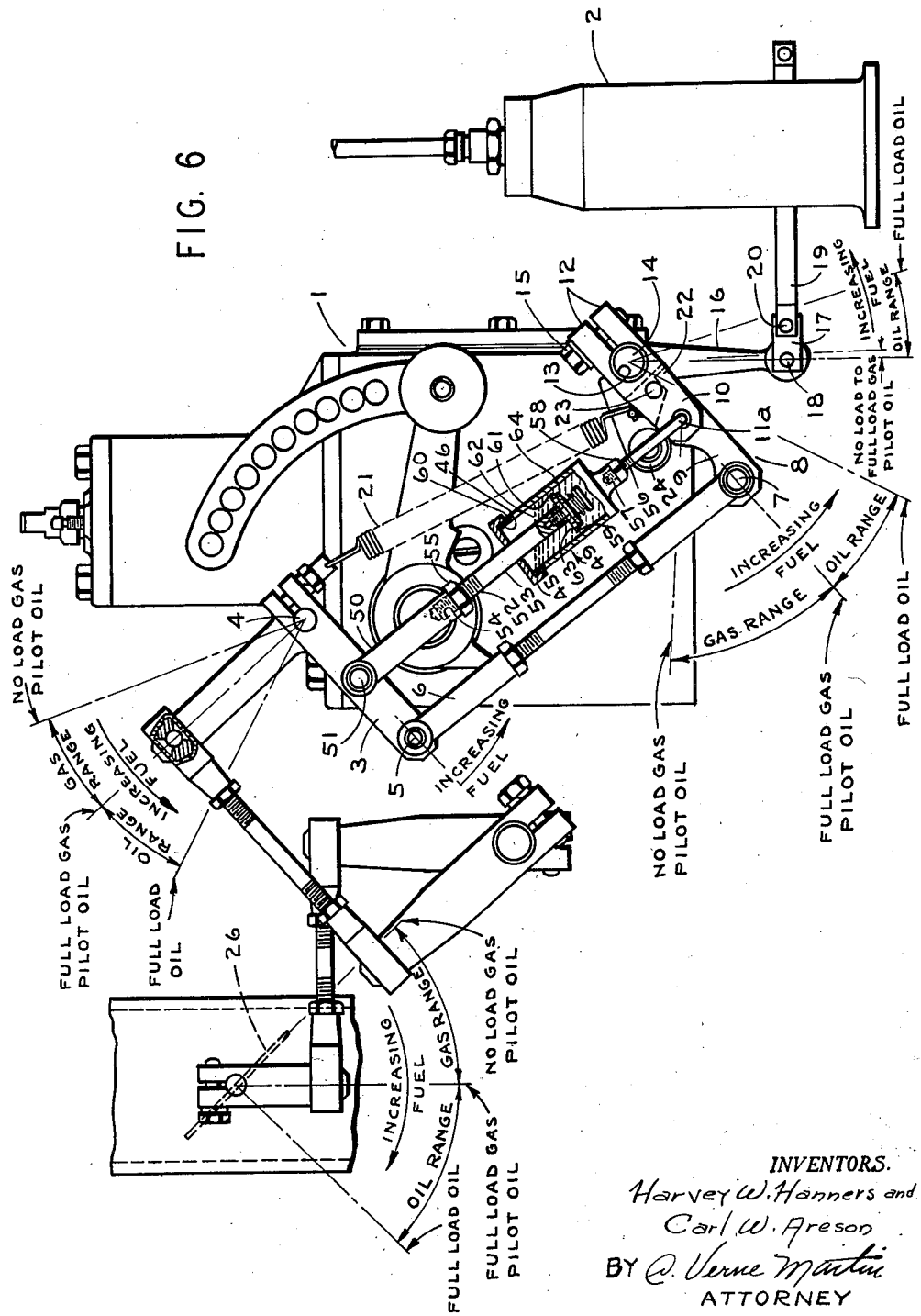

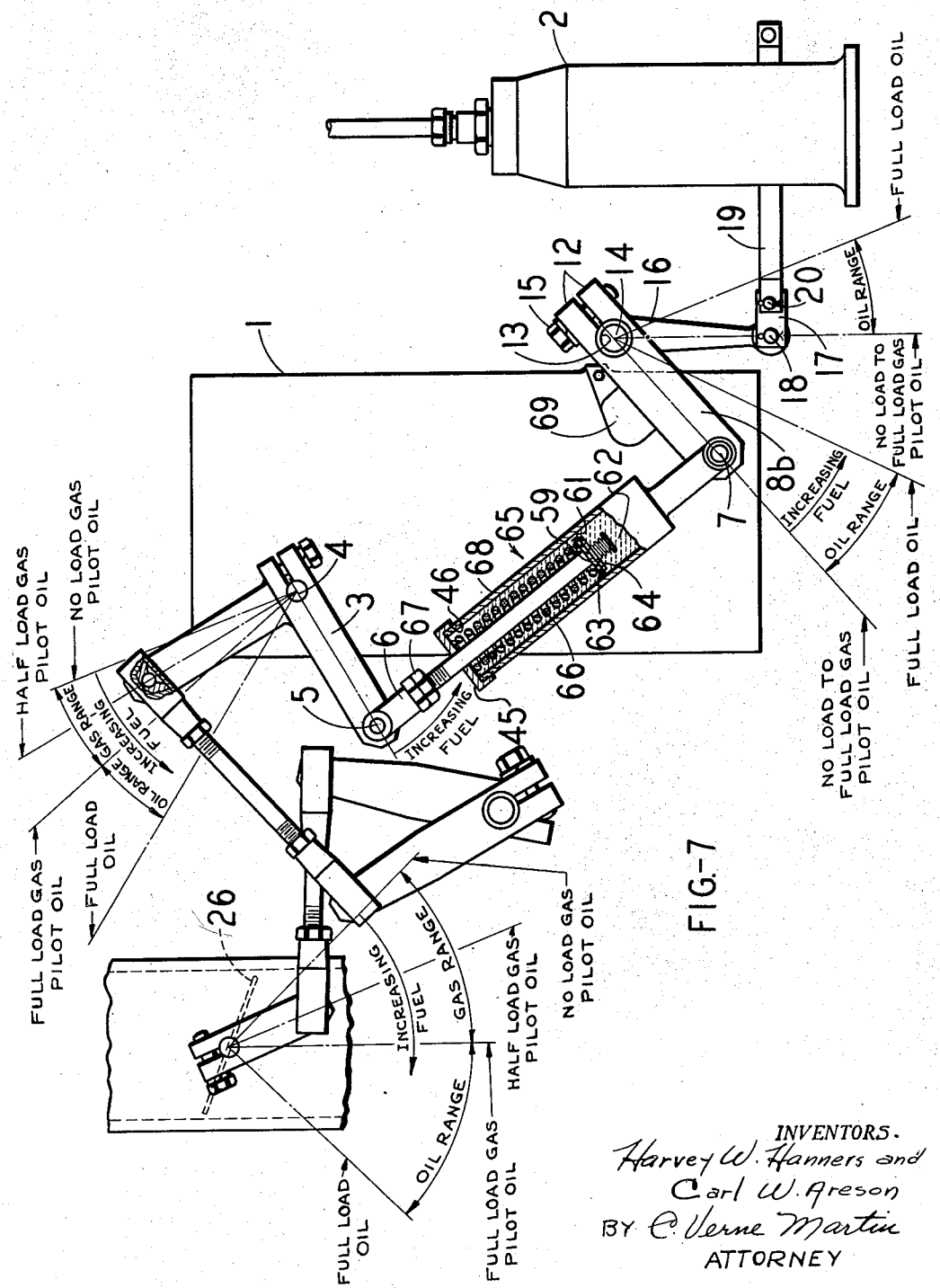

Patented Oct. 16, 1951

2,571,571

UNITED STATES PATENT OFFICE 2,571,571

ACCELERATION ELEMENT FOR FUEL CONTROLLING MEANS FOR INTERNAL-COMBUSTION ENGINES

Harvey W. Hanners and Carl W. Areson, Springfield, Ohio, assignors to The National Supply Company, Pittsburgh, Pa., a corporation of Pennsylvania Application October 18, 1947, Serial No. 780,656

10 Claims. (Cl. 123—140)

This invention relates to means for controlling the flow of fuel to an internal combustion engine during periods of rapid movement of the engine speed controlling means. It may be applied to engines operating on either gaseous or liquid fuel, provided they are equipped with some type of control for fuel regulation, since the invention refers specifically to the operation of a fuel control linkage rather than any particular type of engine. It has been successfully used on full diesels operating on fuel oil, on dual-fuel engines operating on a gaseous fuel using only pilot oil for ignition of the gaseous fuel and for dual-fuel engines operating on a combination of both gaseous fuel and fuel oil.

This invention is related to the subject matter disclosed in the application of Harold F. Shepherd covering "Fuel Regulating Means for Dual-Fuel Engines" filed simultaneously with the instant invention on October 18, 1947, and bearing Serial Number 780,742, which matured as Patent No. 2,454,222 on November 16, 1948, and assigned to the common assignee of both applications, namely, The National Supply Company.

The distinguishing difference between this invention and the above mentioned invention is the unique construction of an acceleration element incorporated in a conventional fuel control linkage for regulating the flow of fuel to the engine during periods of rapid movement of the engine speed controlling means and is applicable when the speed controlling means consists of (a) A governor of fixed setting as used with substantially constant speed engines, or (b) A manually controlled governor as used with variable speed engines, or (c) Merely the manual operation of the fuel controlling linkage as is the accepted practice with some variable speed engine applications.

The conventional design of fuel controlling linkage results in the change in quantity of fuel supplied to the engine being approximately proportional to the amount of motion of the speed controlling means. The limitations of this type of fuel control linkage include the following factors:

(a) With constant speed governor controlled engines, a rapid change of load of substantial amount may result in a momentary speed change in excess of that desired for the particular installation. The magnitude of this momentary speed change is dependent on the sensitivity of the governor, the inherent lag of the fuel system, the moment of inertia of the rotating masses in and connected to the engine and the acceleration rate of the engine. Tests have shown this momentary speed change to be more serious with dual-fuel engines operating on gaseous fuel with pilot oil than with the same engine operating on full diesel fuel. This is particularly due to the increased lag of the gaseous fuel system as compared with the diesel fuel system.

(b) In constant speed engine installation the use of an extremely sensitive governor on an engine which has appreciable lag in the fuel system may, and often does, result in over-correction on the part of the governor with subsequent uncontrolled hunting or surging on the part of the engine-governor system.

(c) In variable speed engine installations, where the speed controlling means consists of either the direct manual control of the fuel controlling linkage or the manual control of the governor setting in the case of a governor controlled fuel linkage, the rate with which the engine responds to a change initiated by the speed controlling means has a direct bearing on the ease of handling of such an engine. The same factors affecting the performance of a constant speed engine also apply to the variable speed engine. With this type of engine also, the time lag of the gaseous fuel system of a dual-fuel engine makes the dual-fuel engine with conventional fuel controlling linkage somewhat more sluggish in its response to movement of the speed controlling means than the same engine operating on full diesel fuel.

The fuel controlling means employed in this invention is primarily an acceleration element formed as an integral part of the typical fuel controlling linkage system used with a diesel or dual-fuel engine. It is not a dash pot for restraining the governor action in the conventional way, neither is it a cushion link connecting the speed controlling means to the throttle so as to delay action. It is analogous to the means for providing extra fuel for acceleration as is the customary practice in automotive carburetor design.

It is, therefore, the principal object of this invention to provide a mechanism to be positioned in the fuel control linkage used with an internal combustion engine in which the increased rate of change of fuel accompanying rapid motion of the speed controlling means serves to decrease the magnitude of the momentary speed change following a rapid load change.

Another object of this invention is to provide for use in an internal combustion engine, a device to stabilize the momentary speed change by an increased rate of change of fuel accompanying rapid motion of the governor incident to a sudden load change.

Another object of this invention is to provide for use in an internal combustion engine having an appreciable time lag in the fuel system, a device to rapidly increase the quantity of fuel delivered to the engine during the time lag in the fuel system to maintain the imposed load during this momentary deficiency in the normal fuel supply.

Another object of this invention is to provide for use in an internal combustion engine having an appreciable time lag in the fuel system, a device to momentarily increase the rate of change of fuel flow as controlled by the governor, thereby obtaining much quicker response from said engine, making it possible to match an otherwise slow acting engine to a sensitive quick acting governor and by such matching of engine response to governor action to eliminate uncontrolled surging or hunting.

Another object of this invention is to provide a device to prevent the racing of an engine and to stabilize its speed when a heavy load on the engine is suddenly decreased.

Another object of this invention is to provide a device for use with the fuel control linkage used on variable speed engines which will produce an accentuated acceleration of such engines when operating under varying load conditions requiring sudden speed changes by rapidly providing an extra amount of fuel to satisfy such demands.

Another object of this invention is to provide an acceleration element to be positioned in the fuel controlling linkage of a compression-ignition engine, operating on diesel oil or dual-fuel, such that said element will cause the rate of change of the amount of fuel supplied to the engine, with respect to the motion of the speed controlling means, to be substantially increased by its action for very rapid motion of the speed controlling means and to be relatively uneffected by its action for very slow movement of the speed controlling means.

Another object of this invention is to provide an acceleration element to be incorporated in the fuel controlling linkage of a diesel or dual-fuel engine to increase the supply of fuel to the engine during the instant of very rapid movement of the governor in the direction of increasing fuel and to be inoperative during the normal or very slow movement of the governor.

Another object of this invention is to provide a device for use with a dual-fuel engine that will give the gaseous fuel fired range of the dual-fuel engine substantially the performance of a full diesel engine.

Another object of this invention is to provide a device for use with a dual-fuel engine that will automatically supply the engine with an additional supply of oil fuel to supplement the deficiency in the gaseous fuel supply during the inherent time lag in the gaseous system due to an increased fuel demand and maintain the total fuel requirements at all times.

Further objects and advantages of this invention will become apparent and in part specifically referred to in the description and specification to follow, which, taken in conjunction with the accompanying drawings, discloses the preferred and two alternate forms of apparatus for carrying out the principles of our invention. It should be understood, however, that the disclosures are illustrative of the principles of our invention in its broader aspects.

Figure 1 is a diagrammatic arrangement, partly in section, illustrating one embodiment of our invention in the form of a double acting acceleration element incorporated in a governor control linkage system for use in controlling the fuel to a compression-ignition engine and shown in its steady or neutral state at approximately half load operating position.

Figure 2:
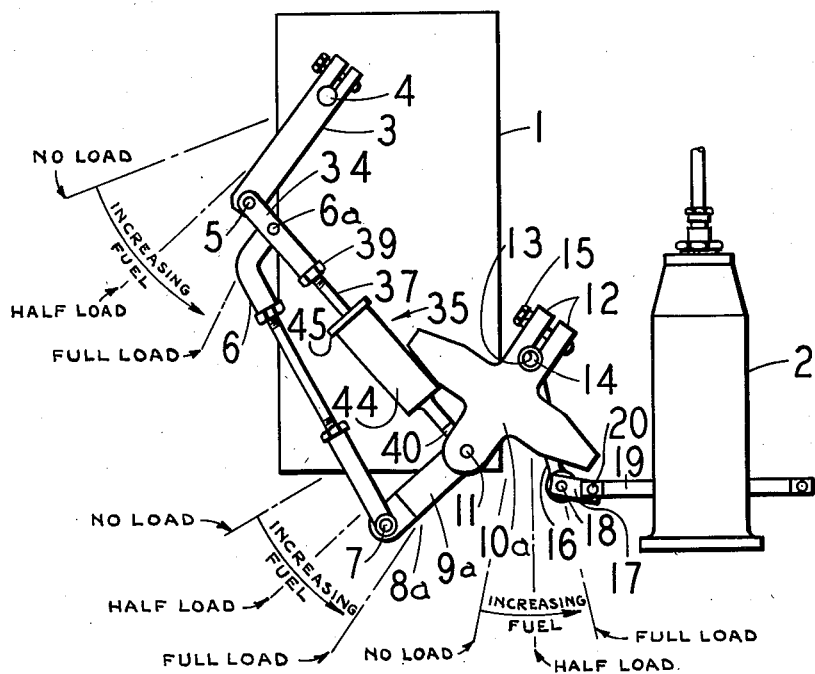

Figure 2 diagrammatically shows, on a reduced scale, the novel linkage arrangement of Figure 1 during a rapid increase in engine load from half load to substantially fully load.

Figure 3:
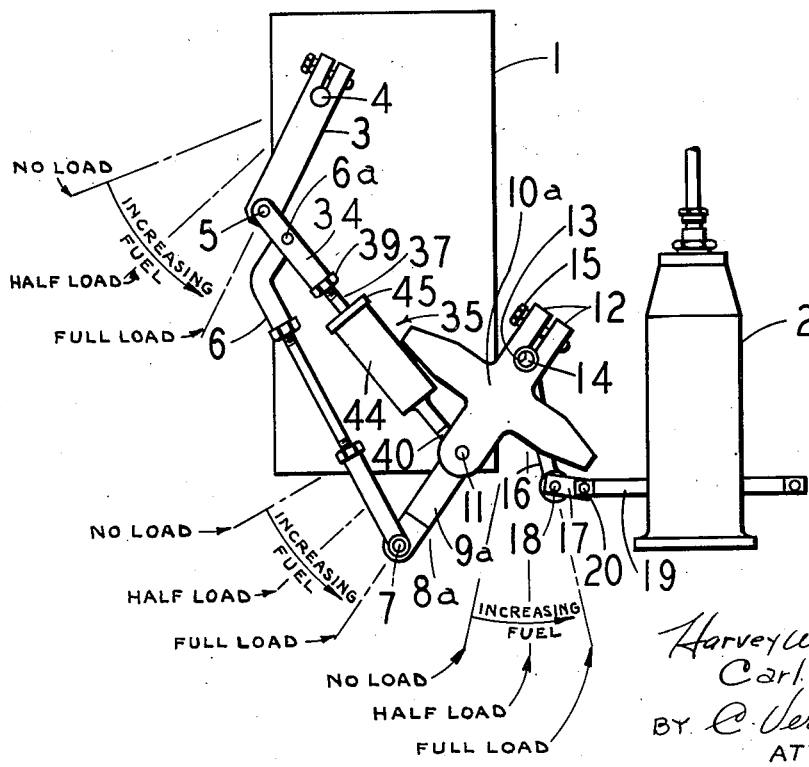

Figure 3 diagrammatically shows, on a reduced scale, the linkage arrangement of Figure 1 after it has attained its steady or neutral operating position at the increased load conditions referred to in Figure 2.

Figure 4 diagrammatically shows, on a reduced scale, the linkage arrangement of Figure 1 during a rapid decrease in engine load from half load to substantially no load or idling operation.

Figure 5 diagrammatically shows, on a reduced scale, the linkage arrangement of Figure 1 after it has reached its steady or neutral operating position at the decreased load conditions referred to in Figure 4.

Figure 6 is a diagrammatic arrangement, partly in section, illustrating another embodiment of our invention in the form of an acceleration element incorporated in a governor control linkage system for use in controlling the fuel to a compression-ignition engine adapted to operate on oil fuel as a full diesel or on dual-fuels (gaseous fuel for operation and pilot oil for ignition) and is shown in the "Full load" position operating on gaseous fuel and using pilot oil only for ignition.

Figure 7 is a diagrammatic arrangement, partly in section, illustrating still another embodiment of our invention in the form of an acceleration element incorporated in a governor control linkage system for use in controlling the fuel to a dual-fuel engine where the variation of pilot oil with the load in the gas range is not required and is shown in the "Half load" position operating on gaseous fuel, using pilot oil only for ignition.

It is to be noted that Figs. 1 to 5 inclusive are applicable to compression ignition engines operating on the solid fuel injection principle while Figs. 6 and 7 disclose the invention as applied to dual-fuel engines operating on either oil, fired by the solid fuel injection principle, or on a gaseous fuel ignited by pilot oil, both of which operate in the presence of an excess volume of air. As is well known, dual-fuel engines operating on gas are normally more sluggish in their response to demands for increased fuel to meet an increase in load and/or speed than a full diesel engine. The applicants' device, to a great measure, overcomes this handicap by suddenly admitting an extra supply of oil fuel to bring the total fuel requirements to the amount necessary to attain speed and load at the increased demand, and maintain the engine at this governor setting until the inherent time lag in the gaseous fuel system is overcome and the gas supply is able to furnish the required fuel for the load and speed. By the time this condition has been reached the device has automatically returned the oil fuel charge to its pilot rate and the governor has been able to maintain load and speed throughout the transition period. The same principle applies when the gas fuel supply decreases or fails entirely. The oil fuel will then supplement the deficiency in the gas fuel supply so that speed and load will be maintained. As a concrete example of the beneficial effects obtained from the use of the applicants' device the results of an actual case is cited. A dual-fuel engine operating as a diesel at 400 R. P. M. can be accelerated to 900 R. P. M. in 6 seconds. The same engine operating on gaseous fuel ignited by pilot oil will require 28 seconds for the same increase in speed but if equipped with our acceleration element the time required to accelerate from 400 R. P. M. to 900 R. P. M. is cut to 9 seconds, definitely demonstrating the value of our invention as applied to a dual-fuel engine and the important part it plays in assisting the gaseous fuel engine to approach the performance of the diesel engine.

For consistency and clarity, the same reference numerals are used in referring to like elements in the three species disclosed in this application and like elements shown in the Shepherd co-pending application filed simultaneously with this application and mentioned above.

In the drawings the numeral 1 represents a governor to be driven by and mounted upon a compression-ignition engine (not shown). It is operatively connected to a fuel pump 2 through a system of links, levers and their accompanying connections to furnish fuel to the engine for its economical and efficient operation.

Referring to Figs. 1 to 5 inclusive, a typical diesel engine governor control linkage, incorporating one form of our new and improved acceleration element, is shown and consists of an actuating arm 3 rigidly secured at one end to the governor shaft 4 and responsive to the motion of the speed controlling means or governor 1. The opposite end of the arm 3 is pivotally attached as by a pin 5 to a connector 34.

A double acting acceleration element 35, which is the crux of the instant invention and which will be explained in detail later, is directly secured to the lower end of the connector 34. An offset adjustable connecting link 6 is pivotally attached to the above mentioned connector 34 intermediate its ends as by pin 6a. The lower end of the offset connecting link 6 is pivotally attached as by pin 7 to a two-piece articulated control lever assembly 8a comprising a floating link 9a and a spring loaded control shaft arm 10a hinged together by the pin 11. The link 9a is held in a neutral position by the action of a pair of compression springs 110 mounted in the control shaft arm 10a. The end of the arm 10a remote from the hinge pin 11 is bifurcated as at 12 and is provided with a bore 13 in communication with the bifurcated end 12. This portion of the arm 10a is rigidly secured to the fuel pump control shaft 14 by the clamping bolt 15, threadably engaging the bifurcated end 12 and securely clamping the arm 10a to the control shaft 14. The fuel pump control lever 16 is secured at its upper end to the shaft 14 and is pivotally connected at its lower end to a link 17 by pin 18. The fuel pump rack 19 is pivotally fastened at one end to the link 17 by means of pin 20, while the opposite end operatively engages the fuel pump 2.

The double acting acceleration element 35, referred to above, is positioned in the governor control linkage in such a manner as to provide a direct connection between the actuating arm 3 and the two-piece articulated control lever assembly 8a. It is rigidly secured at its upper end to the connector 34 by the threaded end 36 of the stem 37 engaging the internally threaded portion 38 of the connector 34 and is firmly secured in place by the lock nut 39. It is pivotally attached to the articulated lever assembly 8a at its lower extremity through the forked end 40 engaging the lever hinge pin 11.

The element 35 consists of a plunger 41, secured to the threaded free end 42 of the stem 37 by a lock nut 43, working in a cylinder 44. A cover 45, through which the stem 37 is free to move, is screw threadably attached as at 46 to the cylinder 44 to form a closed unit for the acceleration element 35. The plunger 41 is immersed in a fluid 47 of such characteristics as to flow without excessive resistance through the annular gap 48 between the plunger 41 and the wall of the cylinder 44 for relatively slow application of load on the stem 37.

When the governor control linkage is subjected to a relatively slow motion, incurred by a steady increase or decrease in load, the actuating arm 3 of the governor 1 exerts a force upon the double acting acceleration element 35 and causes it to change its effective length permitting the motion to be transmitted through the connecting link 6 and the two-piece articulated lever assembly 8a to the control shaft 14 and the fuel pump control lever 16 and through the fuel pump rack 19 to the fuel pump 2.

When it is desired to suddenly increase or decrease the engine load the engine governor speeds up the movement of the actuating arm 3, causing a rapid movement to be transmitted to the stem 37 of the acceleration element 35. In so doing the element 35 acts momentarily as a relatively solid member due to the restrictive action of the annular gap 48 on the flow of the fluid 47 for sudden application of load on the stem 37. While the double acting acceleration element 35 is functioning as a solid member it quickly transmits an added force to the articulated lever assembly 8a at the hinge pin 11, causing the lever assembly 8a to jack-knife about its fulcrum point 11. Due to this added force the floating link 9a is displaced from its neutral position (as shown in Figures 2 and 4) against one of the compression springs 110, thus effecting a substantially greater rate of change in the quantity of fuel delivered to the engine for a given motion of the arm 3 than would otherwise occur.

Cessation of the rapid motion of the arm 3 of the governor 1 results in the double acting acceleration element 35 adjusting its component parts by permitting the plunger 41 to settle through the fluid 47 and come to rest in a stabilized position. This action also allows the floating link 9a to return to its neutral position under the action of the springs 110 and permits the control shaft 14 and the control lever 16 to move to the position as determined by the amount of motion of the actuating arm 3 of the speed controlling means or governor 1 as clearly shown in Figures 3 and 5.

Figure 6 shows a typical fuel control linkage similar to that shown in the Shepherd co-pending application but in which is incorporated a single acting acceleration element as used with either a governor control or a manually operated speed controlling device for a dual-fuel engine. The linkage is shown for an installation in which the no load end of the governor motion is used when operating on gas with pilot oil, and the full load end of the governor motion is used when operating on full diesel fuel. As shown this governor motion is divided so that approximately half of the total available governor motion is used for each fuel, the linkage itself being shown for "Full load gas" and pilot oil or in "No load oil" position. In some instances it is advantageous to use the entire range of the governor motion for operation as a full diesel instead of one-half the motion as described above. Further, there are occasions when it is advisable to use the entire motion of the same governor when the dual-fuel engine is operating on a gaseous fuel. In the latter case it is of particular advantage that the acceleration element be incorporated in the governor control linkage since this element is designed to supply an extra charge of oil to supplement any shortage in the gas supply that may occur and to further take care of the inherent time lag incident to a sudden demand for more gaseous fuel.

This linkage consists of an actuating arm 3 rigidly secured at one end of the governor shaft 4 and is responsive to the speed controlling means or governor 1. The actuating arm 3 controls not only the "gas" controlling means 26 by means of conventional links, shafts and arms, but also controls the fuel "oil" controlling means through a linkage system operating the fuel pump 2 in the following manner. The free end of the arm 3 is pivotally attached as by pin 5 to an adjustable connecting link 6, which in turn is pivotally attached as by pin 7 to a two-piece articulated control lever assembly 8 comprising a floating link 9 and a control arm 10, hinged together by a J-shaped hinge pin 11a. The end of the arm 10, remote from the hinge pin 11a is bifurcated as at 12 and is provided with a bore 13 in communication with the bifurcated ends 12. This portion of the arm 10 is rigidly secured to the fuel pump control shaft 14 by the clamping bolt 15, threadably engaging the bifurcated end 12 and securely clamping the arm 10 to the control shaft 14. The fuel pump control lever 16 is secured at its upper end to shaft 14 and is pivotally connected at its lower end to a link 17 by pin 18. The fuel pump rack 19 is pivotally fastened to the link 17 by means of pin 20 while the opposite end operatively engages the fuel pump 2. When in the diesel part of the governor control range the articulated lever assembly 8 is in effect a solid link, the spring 21 holding the spur 22 of the floating link 9 against the pin 23 as clearly shown in Fig. 6.

A single acting acceleration element 49 is positioned in the governor control linkage in such a manner as to provide a direct connection between the actuating arm 3 and the two-piece articulated control lever assembly 8. A connector 50 is pivotally attached at one end to the actuating arm 3 at a point intermediate its ends by pin 51. The threaded end 52 of the stem 53 engages the internally threaded portion 54 of the connector 50 and is firmly secured in place by the lock nut 55. The threaded portion 56 on the free end of the hinge pin 11a engages the internally threaded portion 57 at the lower end of the element 49. The element and the pin 11a are rigidly connected by lock nut 58.

The element 49 consists of a plunger 59 mounted on the stem 53 and encased in a cylindrical body 60. A cover 45, through which the stem 53 is free to move, is screw-threadably attached as at 46 to the body 60. The plunger 59 is of such diameter as to allow an annular opening 61 of a predetermined amount between said plunger and the inner wall of the cylindrical body 60. The plunger 59 is at all times immersed in a fluid 62 of such characteristics as to permit it to flow through the annular space 61 without appreciable resistance under slow application of load on the stem 53. The plunger 59 is provided with holes 63, which are normally closed by the action of a spring loaded disk 64.

Application of load to the stem 53 in the direction to increase the length of the acceleration element 49 results in motion of the spring loaded disk 64 away from the openings 63, under the influence of the hydraulic pressures developed, allowing the fluid 62 to move through the openings 63 and causing a change of length of the acceleration element 49 in the direction of increasing length to occur without appreciable restraint regardless of the rate of application of the load. Application of load to the stem 53 in the direction of decreasing the length of the acceleration element 49 results in closing the openings 63 in the plunger 59 by the spring loaded disc 64 with subsequent performance similar to that of the double action acceleration element shown in Figures 1 to 5 inclusive.

This acceleration element is effective only in the "Gas range" and only for rapid movement of the actuating arm 3 of the speed regulating means 1 in the direction of increasing fuel. The action of this single acting acceleration element 49 is such that in the gas range of the fuel controlling linkage, rapid movement of the arm 3 in the direction of increasing fuel is transmitted by the acceleration element 49 to the pin 11a causing the floating link 9 to move away from the roller stop 24 with resulting motion of the fuel oil control shaft 14 and the fuel pump control lever 16. This results in a momentary increase in the fuel oil supplied to the engine in addition to the increase of gaseous fuel as determined by the corresponding motion of the gas controlling means 26. Cessation of rapid motion of the arm 3 allows the acceleration element to change length under the force of the spring 21, permitting the control shaft arm 10 to return to the position determined by the return of the floating link 9 against the roller stop 24. For slow motion of the arm 3 in either direction in the gas range, or for rapid motion of the arm 3 in the direction of decreasing fuel in the gas range, or for any motion of the arm 3 in the oil range, the action of the fuel controlling linkage is identical to that of the linkage shown and described in the Shepherd co-pending application, the acceleration element 49 being of such construction and so placed in the linkage as to have no effect on the linkage under these conditions.

Figure 7 shows an alternate application of a single acting acceleration element incorporated into the governor control linkage system used on dual-fuel engines. This alternate linkage is applicable where variation of pilot oil with the load in the "Gas range" is not required. The linkage in Fig. 7 is shown at "Half load gas" position.

The general linkage construction employed in this alternate structure is identical with that shown in Fig. 6 except that a solid fuel oil control shaft lever 8b is employed in the place of the articulated lever assembly 8 and the acceleration element 65 is positioned in the connecting link 6 as an integral part thereof.

Only the new elements pertaining to this modification and the operation of the linkage resulting from their incorporation therein will be discussed in detail in the disclosure of this alternate structure.

Motion of the actuating arm 3 of the speed controlling means or governor 1 in the diesel range is unaffected by the action of the acceleration element 65, the element being held in its collapsed position by the action of the compression spring 66 (which is comparable to the spring 21 in Fig. 6) against the acceleration element plunger 59 with the element 65 against the adjustable stop 67 thus acting in the diesel range, as a rigid link. Motion of the actuating arm 3 in the direction of decreasing fuel in the gas range results in corresponding motion of the gas controlling means 26 by means of the usual system of arms, shafts and links, the fuel oil controlling means 16 being held in the pilot oil position by the action of the compression spring 66 in the cylindrical body 68 of the acceleration element 65, holding the fuel oil control shaft lever 8b against the fixed pilot oil stop 69.

Relatively slow motion of the actuating arm 3 in the direction of increasing fuel in the gas range results in corresponding motion of the gas controlling means 26 but no motion of the fuel oil controlling means 16, the motion of the acceleration element plunger 59 being absorbed by the flow of fluid 62 through the annular space 61 between the plunger 59 and the body 68, the fuel oil control shaft lever 8b being held against the pilot oil stop 69 by the action of the spring 66.

Extremely rapid motion of the actuating arm 3 in the direction of increasing fuel in the gas range results in motion of the gas controlling means 26 and also a motion of the fuel oil controlling means 16 through the action of the acceleration element 65 moving the fuel oil control shaft lever 8b away from the pilot oil stop 69. Cessation of rapid motion of the actuating arm 3 of the speed controlling means 1 allows the fluid 62 in the acceleration element 65 time to flow through the annular space 61 between the plunger 59 and the inside surface of the acceleration element body 68, allowing said body to move with respect to the plunger 59 under the action of the compression spring 66 until the fuel oil control shaft lever 8b is returned to the pilot oil stop 69.

Thus it will be apparent that our device provides an efficient and simple apparatus for effecting an increased rate of change of fuel accompanying rapid motion of the speed controlling means in an internal combustion engine which serves to decrease the magnitude of the momentary speed change following a rapid load change.

While our invention has been disclosed as carried out by apparatus of the above described specific construction, it should be understood that many changes may be made therein without departing from the spirit of the invention in its broader aspects and we do not wish to be limited or restricted to the specific details set forth but wish to reserve to ourselves any further embodiments, modifications and variations that may appear to those skilled in the art or fall within the scope of the appended claims.

Having fully disclosed our invention, what we claim as new and desire to secure by United States Letters Patent is:

1. In an internal combustion engine provided with an engine driven governor to regulate fuel from a source of supply to said engine in response to load demands through a linkage system including an arm actuated by said governor, a spring, an articulated control lever assembly normally held in a neutral position by said spring and an acceleration element pivotally connected between said arm and said lever, said element acting in response to said governor to cause the rate of change of quantity of fuel supplied to said engine to be substantially altered during periods of rapid motion of said governor arm and said spring acting to stabilize said lever in its neutral position at its adjusted setting after the rapid motion of said governor arm ceases.

2. In a dual-fuel engine employing pilot oil for the ignition of gaseous fuel for use in a compression-ignition cycle and provided with an engine driven governor for regulation of the fuel in accordance with the speed and load demands through a linkage system including an arm actuated by said governor, a control lever and an acceleration element operatively interposed between said arm and said lever, all of which cooperate in response to said governor action for causing a momentary change in the quantity of oil fuel in addition to the normal change in the quantity of gaseous fuel with rapid motion of the governor arm.

3. In an internal combustion engine of the compression-ignition type provided with a speed controlling and fuel regulating means to control the fuel from a source of supply to said engine in response to load demands through a linkage system incorporated in said means and including an arm actuated by said means, a spring, an articulated control lever assembly normally held in neutral position by said spring and an acceleration element pivotally connected between said arm and said lever, all of which cooperatively operate to cause the rate of change of the amount of fuel supplied to said engine with respect to the motion of said speed controlling means to be substantially altered by their action for very rapid motion of the speed controlling means, said lever assembly and said element being urged to their adjusted neutral position by said spring when said very rapid motion of said speed controlling means ceases.

4. In an internal combustion engine provided with an engine driven governor to regulate the fuel from a source of supply to said engine in response to load demands through a linkage system including an arm actuated by said governor, an acceleration element and an articulated lever assembly, said assembly comprising a floating link, a spring loaded arm, a hinge pin, a pair of compression springs mounted within said arm and normally holding said link in a neutral position, said element operating as a rigid member under the influence of a very rapid motion of said governor arm to exert a force against said hinge pin to jack-knife said assembly and displace said link from neutral to a position against one of said springs to effect a substantially altered rate of change of quantity of fuel supplied to said engine with respect to the motion of said governor arm, said element and assembly acting through said spring to stabilize said linkage in its neutral position at its adjusted setting after the rapid motion of said governor arm ceases.

5. In an internal combustion engine provided with speed controlling and fuel regulating means to regulate fuel from a source of supply to said engine in response to load demands through a linkage system including an arm actuated by said means, an articulated control lever assembly, an acceleration element pivotally connected between said arm and said lever and a resilient means interposed in said linkage to normally retain said lever in a predetermined neutral position, said lever assembly and said element operatively cooperating to provide a means to cause the rate of change of quantity of fuel supplied to said engine with respect to the motion of said speed controlling means to be substantially altered during periods of rapid motion of said speed controlling means and said element urged by said resilient means to return said lever to its normal setting in its adjusted position after said rapid motion ceases.

6. In an internal combustion engine of the compression-ignition type provided with a speed controlling and fuel regulating means to vary the fuel supplied to said engine in accordance with load demands, said regulating means comprising a linkage system actuated by said speed controlling means and including an acceleration element comprising a cylinder, a stem, a plunger secured to said stem and freely movable within said cylinder, a column of fluid within said cylinder of such characteristics as to resist the passage of said plunger therein and act as a solid link when a sudden rapid external force is applied to said plunger to cause the rate of change of quantity of fuel supplied to said engine with respect to the motion of the speed controlling means to be substantially altered during periods of rapid motion of said speed controlling means and said fluid having such further characteristics as to allow said plunger to freely pass through said fluid when the sudden rapid external force ceases and becomes a slow steady force to allow said linkage to stabilize itself to its adjusted position.

7. In combination with a governor driven by an internal combustion engine regulating the fuel supply to maintain load and speed demands of said engine during intervals of rapid changes in load and speed as well as during the normal operation thereof, a governor controlled linkage including an arm actuated by said governor, a fuel control lever, an acceleration element pivotally connected between said arm and said lever, a spring interposed in said linkage to normally retain said lever in a predetermined position, said element adapted to operate as a rigid unit during periods of rapid changes of said load and speed to instantly cause said control lever to deliver fuel in such quantities as to satisfy said rapid changes and said element urged by said spring to return said governor linkage to its normal setting in its adjusted position after said rapid changes cease.

8. In combination with a governor driven by an internal combustion engine regulating the fuel supply to maintain load and speed demands of said engine during intervals of rapid changes in load and speed as well as during the normal operation thereof, a governor controlled linkage including an arm actuated by said governor, a fuel control lever, a plunger actuated fluid controlled acceleration element pivotally connected between said arm and said lever, a spring interposed in said linkage to normally retain said lever in a predetermined position, a restricted passage within said element to retard the rapid passage of the plunger through the fluid to cause said element to operate as a rigid unit during periods of rapid changes of said load and speed to instantly urge said control lever to deliver fuel in such quantities as to satisfy said rapid changes and said element urged by said spring to return said governor linkage to its normal setting in its adjusted position after said rapid changes cease.

9. In a dual fuel engine having an appreciable time lag in the gaseous fuel system and employing pilot oil for ignition and provided with an engine driven governor for regulating the total fuel in response to speed and load demands through a linkage system including an arm actuated by said governor, a fuel control lever, resilient means to normally retain said lever in a stabilized position and an acceleration element pivotally connected between said arm and said lever, said element operating in response to said governor action through said arm to momentarily increase said pilot oil during the rapid motion of said governor arm in the direction of increasing fuel to provide the necessary total fuel during the time lag in the gaseous fuel system and said resilient means urging said control lever to its adjusted stabilized position when said rapid motion of said governor arm ceases.

10. In a dual fuel engine having an appreciable time lag in the gaseous fuel system and employing pilot oil for ignition and provided with an engine driven governor for regulating the total fuel in response to speed and load demands through a linkage system including an arm actuated by said governor, a spring, a pilot oil stop, a fuel control lever normally abutting said stop and an acceleration element pivotally connected between said arm and said lever, said element operating in response to said governor action through said arm to rapidly move said lever away from said stop to increase said pilot oil during rapid motion of said governor arm in the direction of increasing fuel to provide the necessary total fuel during the time lag in the gaseous fuel supply and said spring urging said lever to return to said stop when said gaseous fuel is supplied in sufficient quantities to carry the load at the increased governor setting.

HARVEY W. HANNERS.
CARL W. ARESON.

REFERENCES CITED

The following references are of record in the file of this patent:

UNITED STATES PATENTS

| Number | Name | Date |
| --- | --- | --- |
| 2,074,514 | Muller | Mar. 23, 1937 |
| 2,166,866 | Hansen | July 18, 1939 |